United States Patent
Line et al.

(10) Patent No.: US 10,926,668 B2
(45) Date of Patent: Feb. 23, 2021

(54) TRACK ASSEMBLY FOR USE IN VEHICLE

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Jimmy Moua, Canton, MI (US); Gregory Hagedorn, Bloomfield Hills, MI (US); Adam Ewel, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 99 days.

(21) Appl. No.: 16/424,824

(22) Filed: May 29, 2019

(65) Prior Publication Data

US 2020/0376986 A1 Dec. 3, 2020

(51) Int. Cl.
| | |
|---|---|
| *B60N 2/075* | (2006.01) |
| *B60N 2/08* | (2006.01) |
| *B60R 16/023* | (2006.01) |
| *B60P 7/08* | (2006.01) |
| *B60N 2/07* | (2006.01) |

(52) U.S. Cl.
CPC .......... *B60N 2/075* (2013.01); *B60N 2/0722* (2013.01); *B60N 2/0806* (2013.01); *B60N 2/0831* (2013.01); *B60P 7/08* (2013.01); *B60R 16/023* (2013.01)

(58) Field of Classification Search
CPC .... B60N 2/075; B60N 2/0722; B60N 2/0806; B60N 2/0831; B60P 7/08; B60R 16/023
See application file for complete search history.

(56) References Cited

U.S. PATENT DOCUMENTS

| | | | |
|---|---|---|---|
| 4,262,963 A | 4/1981 | Bauer et al. | |
| 6,997,499 B2 | 2/2006 | Tsubaki et al. | |
| 8,245,994 B2 | 8/2012 | Yamada et al. | |
| 9,376,044 B2 | 6/2016 | Fujita et al. | |
| 2012/0280104 A1* | 11/2012 | Veen | B60N 2/1615 248/671 |
| 2020/0189423 A1* | 6/2020 | Dry | B60R 16/03 |

* cited by examiner

*Primary Examiner* — Lori L Lyjak
(74) *Attorney, Agent, or Firm* — David Coppiellie; Price Heneveld LLP

(57) ABSTRACT

A track assembly is provided that includes a track operably coupled with a floor pan. A rail cartridge is slidably coupled with the track. The rail cartridge includes an upper portion and a lower portion. The upper portion defines a receiving well. A connection cartridge is operably coupled with a seat base. The connection cartridge includes an interface member and defines a slot. The upper portion of the rail cartridge is received within the slot. The interface member is received within the receiving well of the rail cartridge. A latch mechanism includes a release lever and a tab. The release lever is configured to selectively lower the tab to open the receiving well of the rail cartridge.

20 Claims, 8 Drawing Sheets

TRACK ASSEMBLY FOR USE IN VEHICLE

FIELD OF THE DISCLOSURE

The present disclosure generally relates to a track assembly, and more specifically to a track assembly for a vehicle seating assembly.

BACKGROUND OF THE DISCLOSURE

Vehicle seats often need to be moved between various positions within a vehicle. However, with variations in how the vehicle seats connect with a floor of the vehicle and/or with a track assembly of the vehicle, the removable and adjustment of the seats can be time consuming.

SUMMARY OF THE DISCLOSURE

According to one aspect of the present disclosure, a track assembly includes a track operably coupled with a floor pan. A rail cartridge is slidably coupled with the track. The rail cartridge includes an upper portion and a lower portion. The upper portion defines a receiving well. A connection cartridge is operably coupled with a seat base. The connection cartridge includes an interface member and defines a slot. The upper portion of the rail cartridge is received within the slot. The interface member is received within the receiving well of the rail cartridge. A latch mechanism includes a release lever and a tab. The release lever is configured to selectively lower the tab to open the receiving well of the rail cartridge.

Embodiments of this aspect of the disclosure can include any one or a combination of the following features:
- a track assembly further including a first electrical connector coupled with an end of a rail cartridge and a second electrical connector coupled with a connection cartridge, wherein the first electrical connector is configured to engage with the second electrical connector;
- a connection cartridge including first and second sidewalls spaced apart by a top wall, wherein the connection cartridge defines an opening;
- a latch mechanism extending upward from a rail cartridge, wherein the latch mechanism is positioned to extend through an opening of a connection cartridge;
- a track assembly further including a locking pin extending through a first pair of receiving apertures defined by a connection cartridge, wherein the locking pin further extends through a second pair of receiving apertures defined by an upper portion of a rail cartridge;
- a latch mechanism being rotatable so that a release lever is movable between a raised position and a lowered position, wherein the raised position of the release lever corresponds with an unlocked position of the latch mechanism and the lowered position of the release lever corresponds with a locked position of the latch mechanism; and/or
- the release lever including first and second opposing arms.

According to another aspect of the present disclosure, a track assembly includes a track. A rail cartridge is slidably coupled with the track and defines a receiving well. A connection cartridge is coupled with the rail cartridge and includes an interface member. The interface member is configured to be received within the receiving well of the rail cartridge. A latch mechanism includes a release lever. The release lever is configured to selectively release the interface member of the connection cartridge from the receiving well of the rail cartridge. A first electrical connector is coupled with the rail cartridge. A second electrical connector is coupled with the connection cartridge. The first electrical connector is coupled with the second electrical connector when the interface member of the connection cartridge is positioned within the receiving well of the rail cartridge.

Embodiments of this aspect of the disclosure can include any one or a combination of the following features:
- a rail cartridge including an upper portion integrally formed with a lower portion, wherein the upper portion extends upward from the lower portion;
- a connection cartridge including first and second sidewalls spaced apart by a top wall, wherein the first and second sidewalls are positioned to frame an upper portion of a rail cartridge;
- an upper portion of a rail cartridge being narrower than a lower portion of the rail cartridge;
- a connection cartridge being coupled with a seat base;
- a connection cartridge being coupled with a storage container; and/or
- a receiving well extending from an end of a rail cartridge opposite a first electrical connector.

According to another aspect of the present disclosure, a track assembly includes a rail cartridge having an upper portion and a lower portion. The upper portion defines a receiving well. A connection cartridge includes an interface member and defines a slot. The interface member is configured to be received within the receiving well of the rail cartridge when the upper portion of the rail cartridge is received by the slot. A first electrical connector is positioned on an end of the rail cartridge. A second electrical connector is positioned on the connection cartridge. The first electrical connector is coupled with the second electrical connector when the interface member of the connection cartridge is positioned within the receiving well of the rail cartridge.

Embodiments of this aspect of the disclosure can include any one or a combination of the following features:
- a lower portion of a rail cartridge being slidably received by a track;
- a connection cartridge being positioned to frame an upper portion of a rail cartridge;
- a track assembly including a latch mechanism hingedly coupled with a rail cartridge, wherein the latch mechanism includes a release lever;
- a latch mechanism including a tab, wherein a release lever is configured to be selectively lowered to move the tab from an open position to a closed position; and/or
- an interface member coupled within a receiving well when a tab is in a closed position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
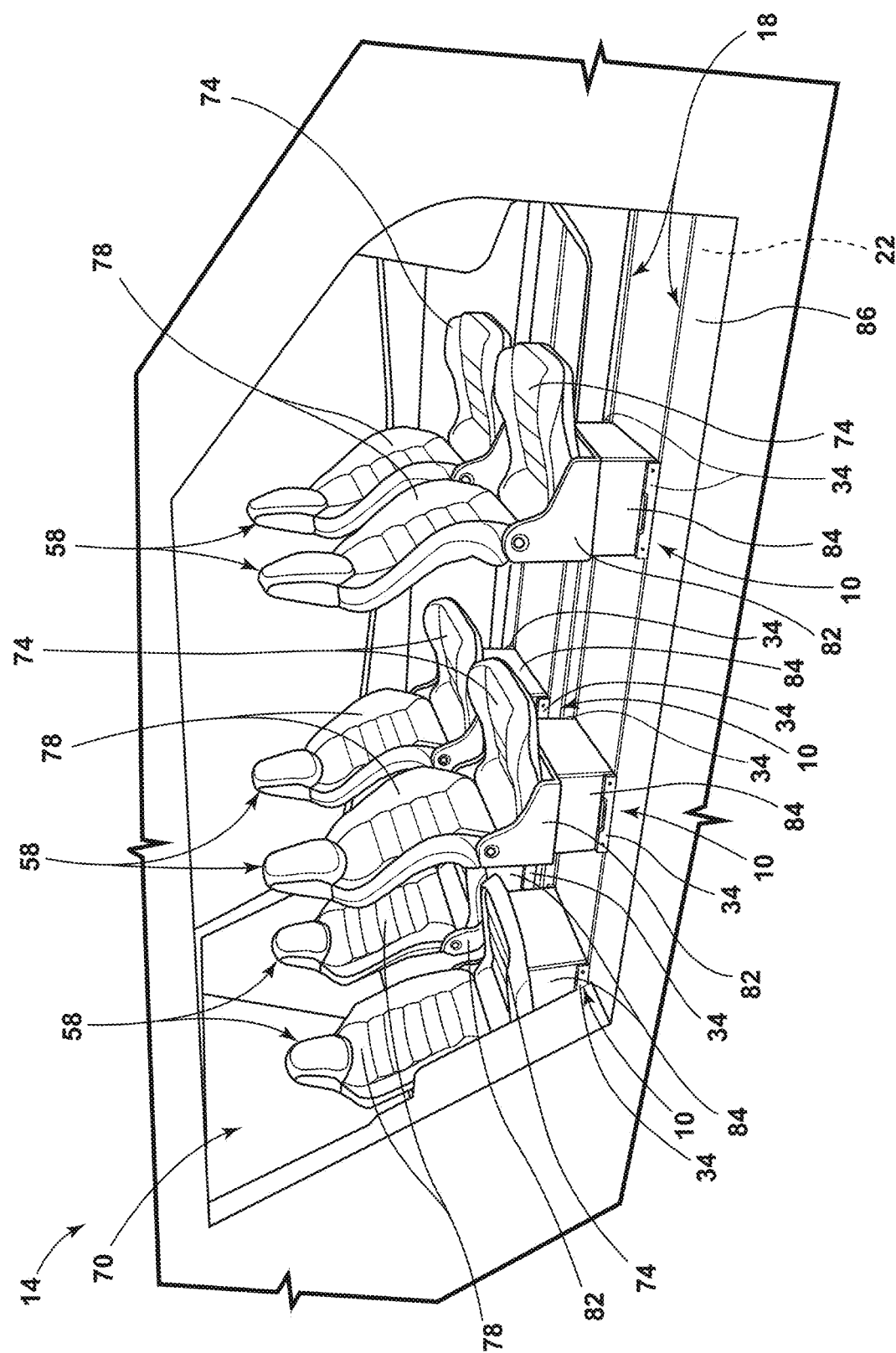
FIG. 1 is a side perspective view of a cabin of a vehicle including a configuration of seating assemblies using a track assembly, according to some examples.

The present illustrated embodiments reside primarily in combinations of method steps and apparatus components related to a track assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates a track assembly for use within a vehicle 14. The track assembly 10 includes a track 18. The track 18 may be operably coupled with a floor pan 22 of the vehicle 14. A rail cartridge 26 may be slidably coupled with the track 18 and may define a receiving well 30. A connection cartridge 34 may be coupled with the rail cartridge 26. The connection cartridge 34 may include an interface member 38 configured to be received within the receiving well 30 of the rail cartridge 26. A latch mechanism 42 may include a release lever 46 configured to selectively release the interface member 38 of the connection cartridge 34 from the receiving well 30 of the rail cartridge 26. A first electrical connector 50 may be coupled with the rail cartridge 26. A second electrical connector 54 may be coupled with the connection cartridge 34. The first electrical connector 50 may be coupled or engaged with the second electrical connector 54 when the interface member 38 of the connection cartridge 34 is positioned within the receiving well 30 of the rail cartridge 26. The track assembly 10 may be used to couple a seating assembly 58 with the floor pan 22 of the vehicle 14. In other examples, the track assembly 10 may be used to couple a storage container 62 with the floor pan 22 of the vehicle 14.

Referring now to FIG. 1, a cabin 70 of the vehicle 14 may be provided with one or more seating assemblies 58. Each seating assemblies 58 includes a seat base 74 operably coupled with a seatback 78. The seat base 74 and the seatback 78 may be pivotably coupled to one another by way of a carrier 82. In various examples, the carrier 82 may be directly coupled to the tracks 18 (e.g., by anchors). Alternatively, in various examples, the carrier 82 may be coupled to the tracks 18 indirectly (e.g., by a carriage 84). The seating assemblies 58 may be positioned at various locations along the tracks 18 within the cabin 70. For example, the seating assemblies 58 may be positioned in a conventional first row, second row, and/or third row configuration. However, it will be understood that the configuration illustrated in FIG. 1 is exemplary in nature and is not intended to limit the scope of the present disclosure.

Figure 2:
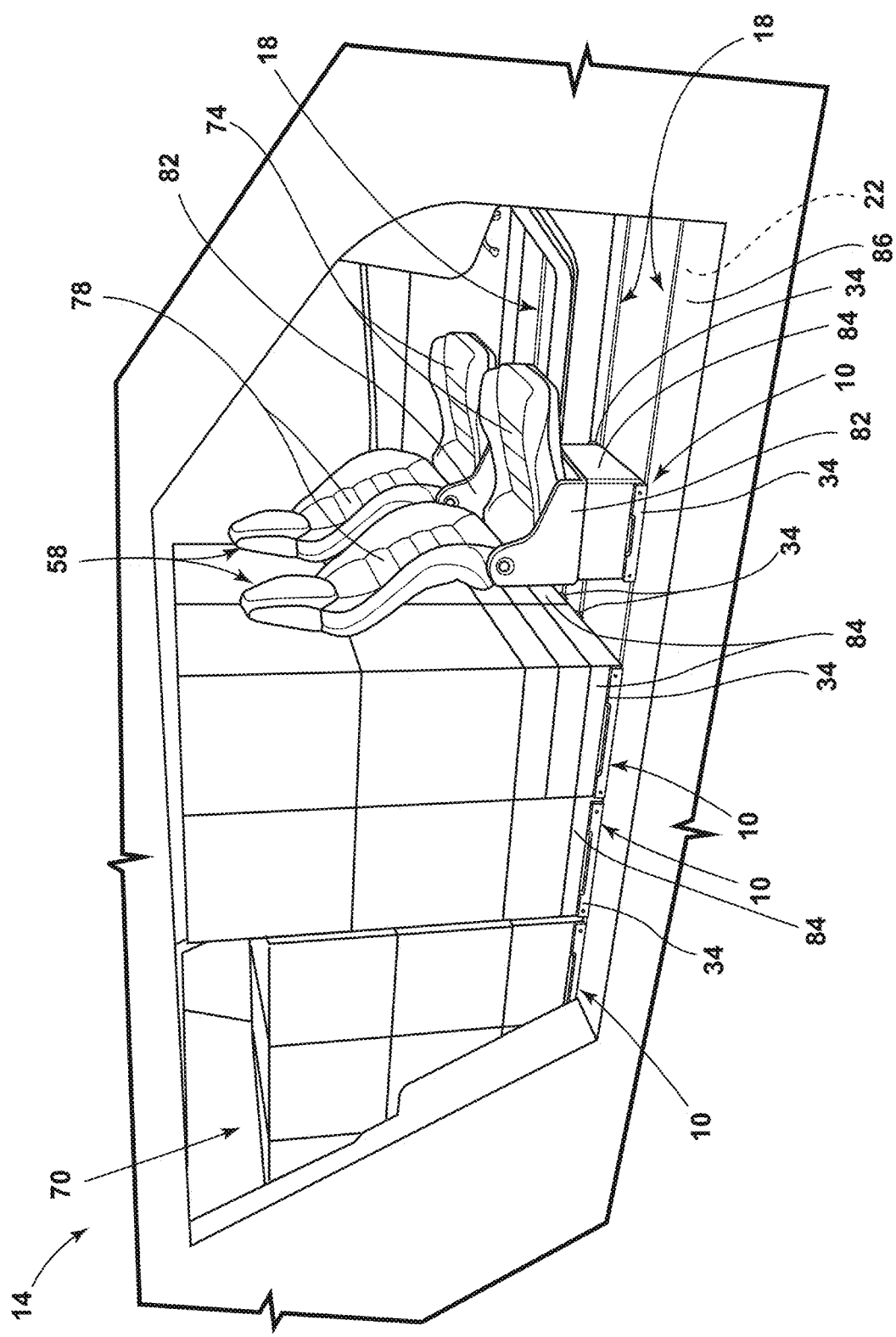
FIG. 2 is a side perspective view of a cabin of a vehicle including a configuration of seating assemblies and storage containers using a track assembly, according to some examples.
Figure 3B:
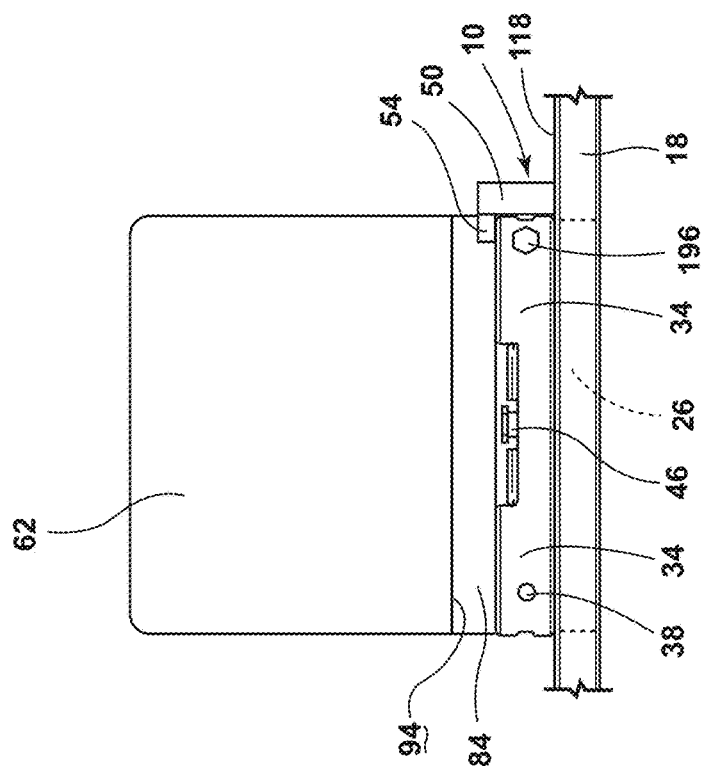
FIG. 3B is a side profile view of a storage container including a track assembly, according to some examples.
Figure 3A:
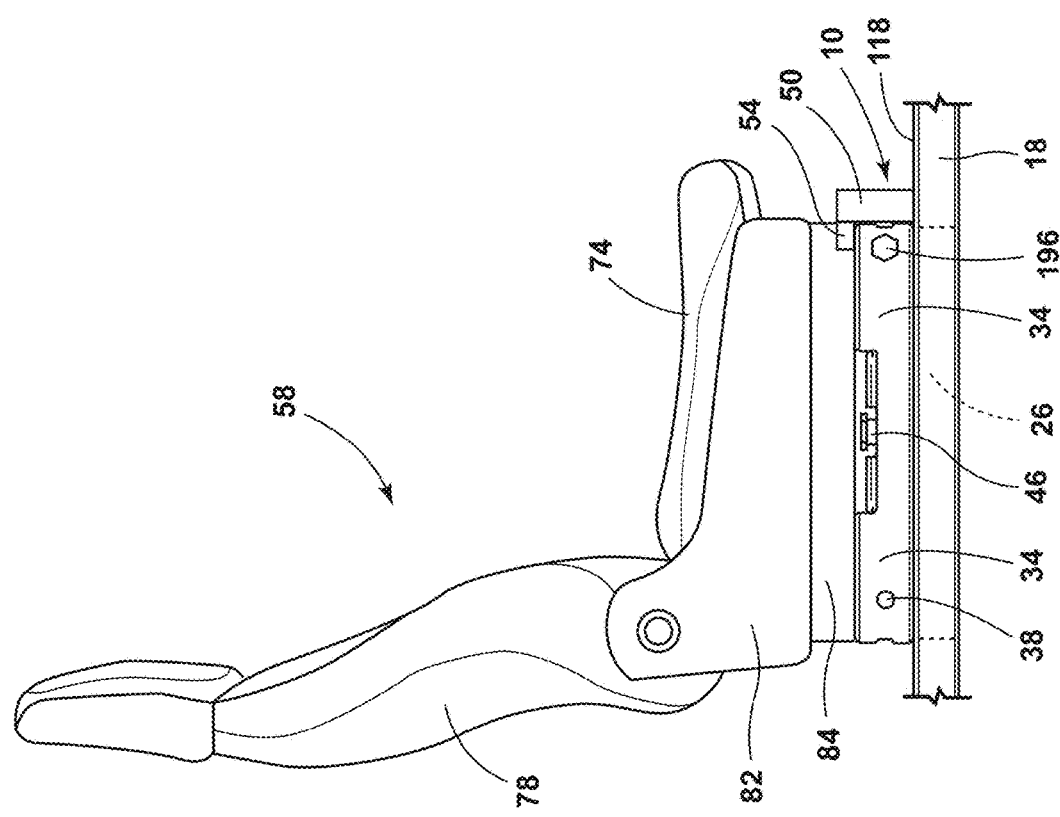
FIG. 3A is a side profile view of a seating assembly including a track assembly, according to some examples.
Figure 4:
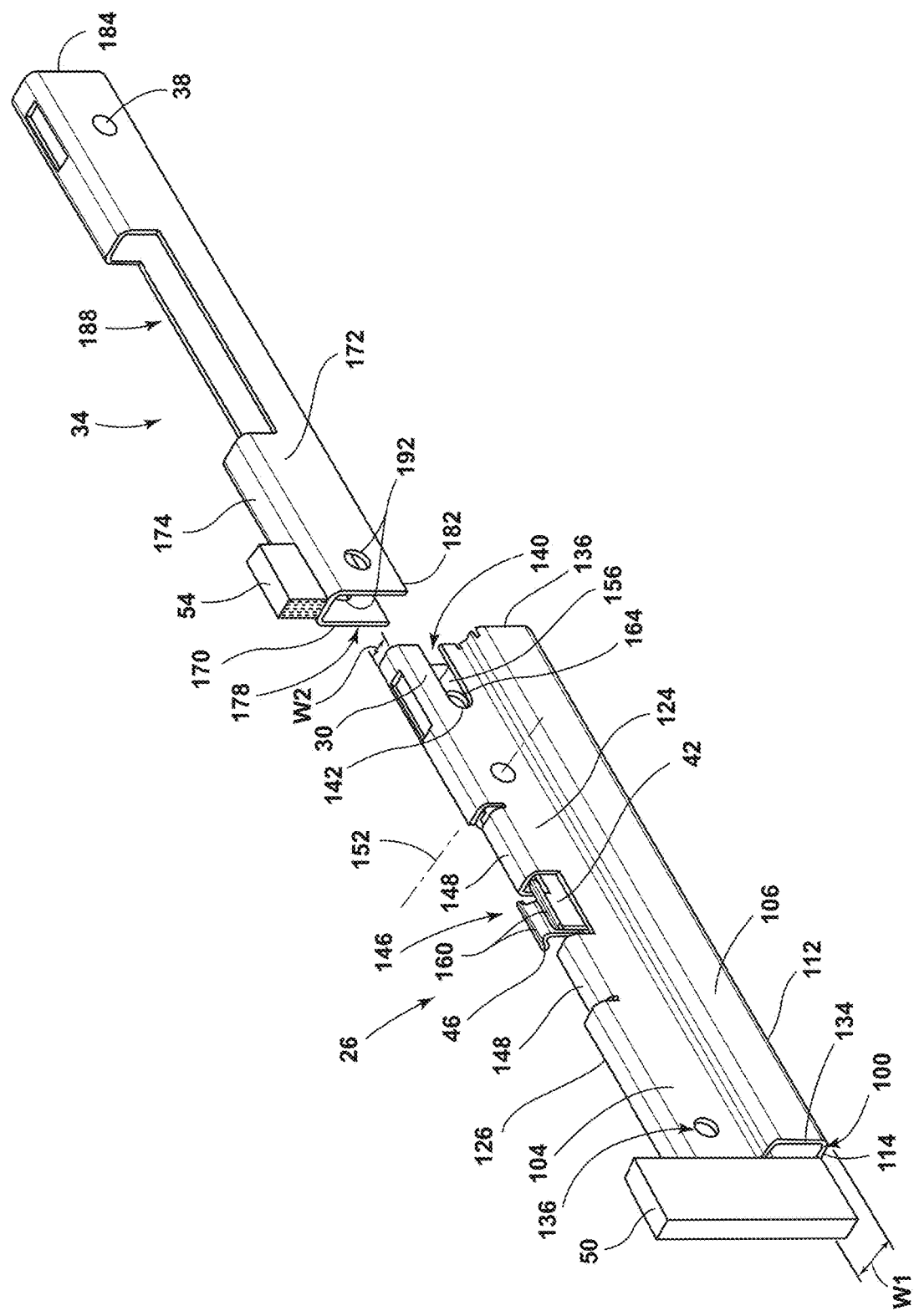
FIG. 4 is an exploded view of a rail cartridge and a connection cartridge of a track assembly, according to some examples.
Figure 5:
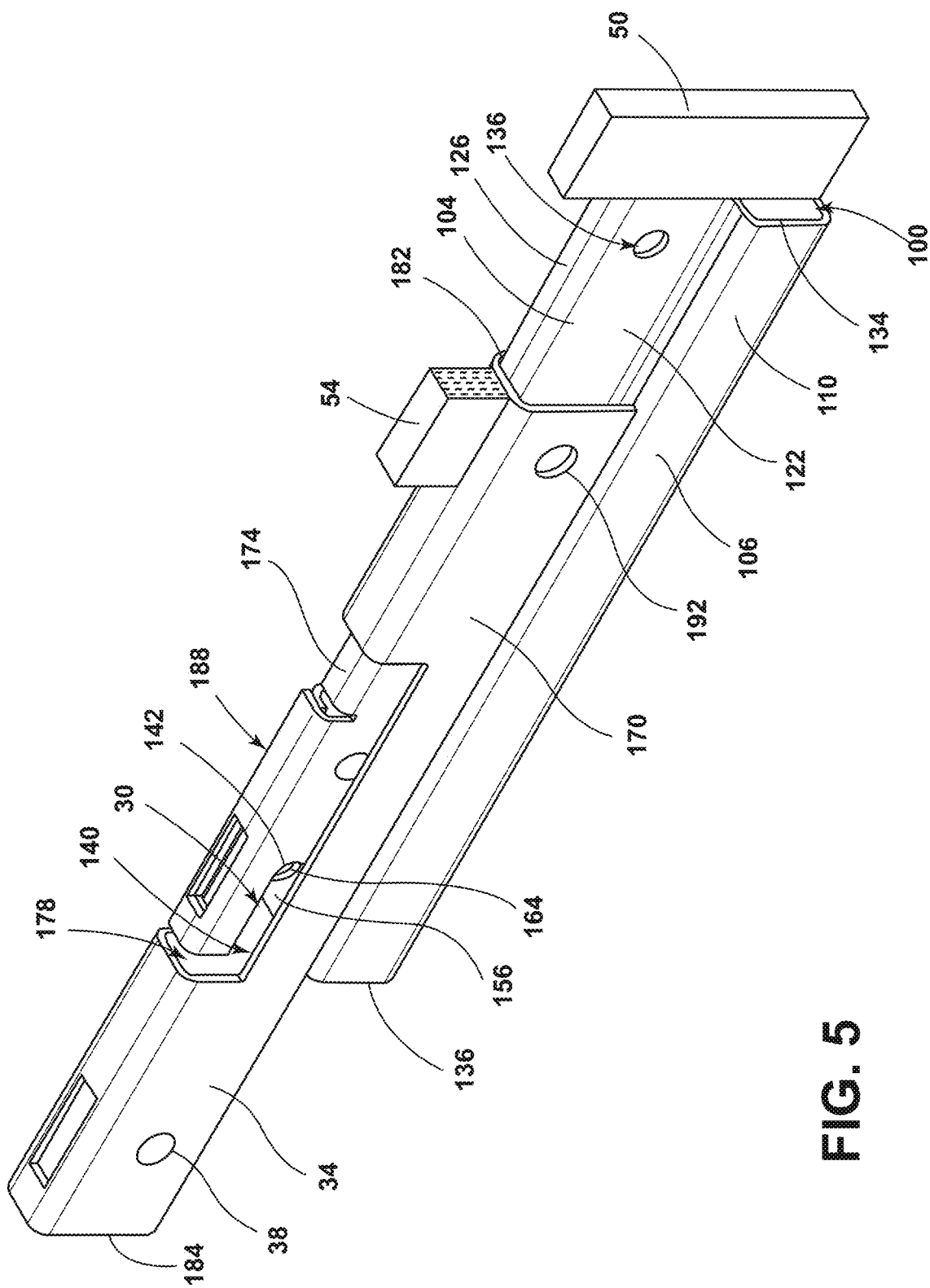
FIG. 5 is a top perspective view of the rail cartridge partially engaged with the connection cartridge of the track assembly of FIG. 4.
Figure 6:
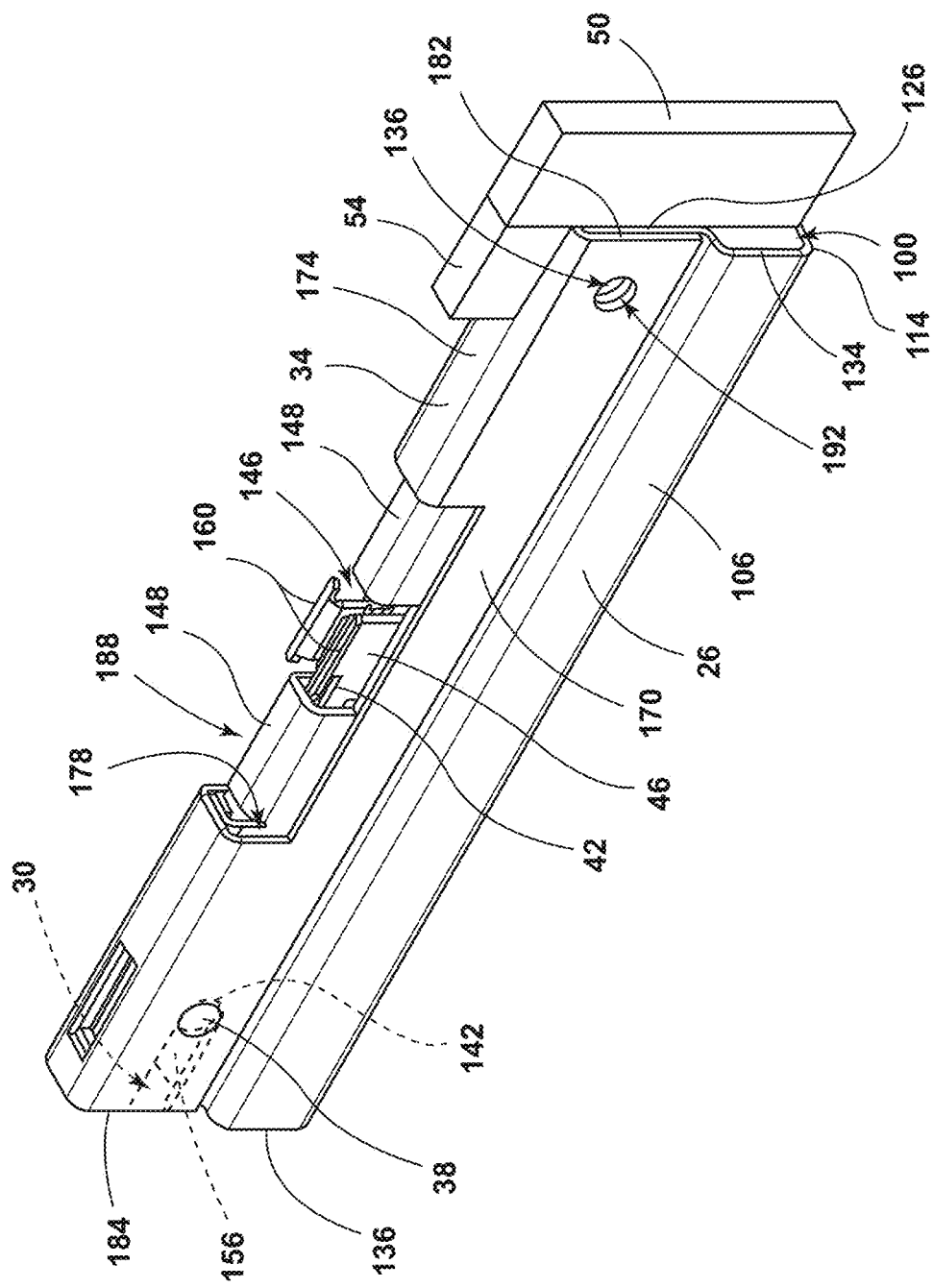
FIG. 6 is a top perspective view of the rail cartridge engaged with the connection cartridge of the track assembly of FIG. 4.

Referring now to FIG. 2, one or more storage containers 62 may be positioned proximate the seating assemblies 58. For example, the one or more storage containers 62 may be positioned vehicle rearward of the seating assemblies 58. In various examples, the storage containers 62 may be stackable such that two or more storage containers 62 may be coupled together to form a storage unit. It will be understood that the seating assemblies 58 and storage containers 62 may be interchangeable such that each seating assembly 58 may be replaced by a storage container 62 and, likewise, each storage container 62 may be replaced by a seating assembly 58. However, it will be understood that the configuration illustrated in FIG. 2 is exemplary in nature and is not intended to limit the scope of the present disclosure.

Each of the seating assemblies 58 and/or the storage containers 62 may be slidably coupled with the floor pan 22 of the vehicle 14 by a track assembly 10. Each track assembly 10 may include one or more of the tracks 18. The tracks 18 may be positioned in pairs and may be spaced apart. The tracks 18 may extend from a front of the cabin 70 of the vehicle 14 to a rear of the cabin 70 of the vehicle 14 or may extend only partially through the cabin 70 of the vehicle 14. In various examples, each track 18 may be integrally formed with the floor pan 22 of the vehicle 14. In other examples, each track 18 may be operably coupled with the floor pan 22 of the vehicle 14. The tracks 18 may be positioned beneath a floor 86 of the vehicle 14. Alternatively, the tracks 18 may extend above the floor 86 of the vehicle 14 and protrude into the cabin 70 of the vehicle 14. The tracks 18 of the track assemblies 10 may be visible or hidden, depending on the configuration the vehicle 14. It will be understood that the track assemblies 10 and tracks 18 may be used in any vehicle 14 including, for example, coupes, sedans, SUVs, trucks, etc. It will further be understood that the positioning of the tracks 18 of the track assemblies 10 may be adjusted to accommodate the vehicle type.

Referring now to FIGS. 1-3B, one or more rail cartridges 26 may be slidably coupled with each of the tracks 18 of the track assembly 10. According to various examples, the rail cartridges 26 may be positioned in pairs and spaced apart to complement the spacing of the respective tracks 18. Each of the rail cartridges 26 may be movable along the respective track 18 in a forward direction or a rearward direction through the cabin 70 of the vehicle 14. It will be understood that each of the rail cartridges 26 is uniform in size, shape, and engagement.

Each rail cartridge 26 may be operably coupled with a respective connection cartridge 34, as discussed in more detail elsewhere herein. The connection cartridges 34 may be positioned in pairs to complement the rail cartridges 26. Each connection cartridge 34 may be coupled with a seating assembly 58 or a storage container 62. Where the connection cartridge 34 is coupled with a seating assembly 58 (FIG. 3A), the connection cartridge 34 may be operably coupled with the seat base 74. Alternatively, the connection cartridge 34 may be operably coupled with the carrier 82 or the carriage 84. Where the connection cartridge 34 is coupled with a storage container 62 (FIG. 3B), the connection cartridge 34 may be operably coupled with a bottom surface 94 of the storage container 62. In some examples, the storage container 62 may be positioned on a carriage 84, such that the connection cartridge 34 is operably coupled to the carriage 84 of the storage container 62. It will be understood that a plurality of rail cartridges 26 and corresponding connection cartridges 34 may be used where the storage container 62 requires additional support based on size. For example, a plurality of rail cartridges 26 and corresponding connection cartridges 34 may be used where a storage container 62 spans the width of the vehicle 14.

Referring now to FIGS. 3A-6, each rail cartridge 26 may be an elongated member including upper and lower portions 104, 106 and defining a channel 100. The lower portion 106 may have first and second lower sidewalls 110, 112 spaced apart by a bottom wall 114. The lower portion 106 of the rail cartridge 26 may be slidably received by the respective track 18 (FIGS. 3A and 3B) and may be sized to engage with the track 18. For example, each of the first and second lower sidewalls 110, 112 may have a height configured to position the upper portion 104 of the rail cartridge 26 above a top wall 118 of the respective track 18. The bottom wall 114 may have a first width W1. The first width W1 may be substantially the same or less than a width of the track 18.

The upper portion 104 of the rail cartridge 26 may be centered relative to the lower portion 106 of the rail cartridge 26. The upper portion 104 extends upward from the lower portion 106 and may include first and second upper sidewalls 122, 124 spaced apart by a top wall 126. In the illustrated example, the top wall 126 is formed by overlapping ends of the first and second upper sidewalls 122, 124. However, it is contemplated that the top wall 126 may be a single wall integrally formed with the first and second upper sidewalls 122, 124 without departing from the scope of the present disclosure. The top wall 126 of the upper portion 104 may have a second width W2. The second width W2 may be less than the first width W1 of the bottom wall 114 of the lower portion 106. In other words, the upper portion 104 of the rail cartridge 26 may be narrower than the lower portion 106 of the rail cartridge 26.

Each of the first and second upper sidewalls 122, 124 of the upper portion 104 of the rail cartridge 26 may define a first pair of receiving apertures 130 defined proximate a first end 134 of the rail cartridge 26. Each of the first and second upper sidewalls 122, 124 of the upper portion 104 may further define the receiving well 30 proximate a second end 136 of the rail cartridge 26. As shown in the illustrated example, the receiving well 30 may be elongated and may extend from the second end 136 of the rail cartridge 26 to the first end 134 of the rail cartridge 26. The receiving well 30 may have an open end 140 opposite a curved edge 142. The curved edge 142 may be positioned between the open end 140 of the receiving well 30 and the first end 134 of the rail cartridge 26 and may be configured to act as a stop, as discussed elsewhere herein.

Furthermore, the upper portion 104 of each rail cartridge 26 may define an opening 146. The opening 146 may be elongated and may be positioned between the first end 134 of the rail cartridge 26 and the second end 136 of the rail cartridge 26. The opening 146 may be sized to receive the release lever 46 of the latch mechanism 42 as discussed in more detail below. In various examples, the opening 146 may be framed by ledges 148 positioned on either side of the opening 146. The ledges 148 may be positioned between the top wall 126 of the upper portion 104 and the lower portion 106 and may be substantially symmetrical with relation to the opening 146.

The latch mechanism 42 may be hingedly coupled with one or both of the first and second upper sidewalls 122, 124 of the upper portion 104 of the rail cartridge 26. For example, the latch mechanism 42 may be rotatable about a pivot axis 152. The latch mechanism 42 may include the release lever 46 and a tab 156. The release lever 46 may include opposing arms 160 extending upward from the latch mechanism 42. The tab 156 may be generally wedge shaped. In various examples, an inner edge 164 of the tab 156 may be curvilinear to provide the receiving well 30 with a generally circular cross-section.

The latch mechanism 42 is movable between a locked position and an unlocked position. In various examples, the latch mechanism 42 may be biased in the locked position. In other examples, the latch mechanism 42 may be secured in one of the locked position and the unlocked position using a stop. When the latch mechanism 42 is in the locked position, the tab 156 may be in a closed position. When the latch mechanism 42 is in the unlocked position, the tab 156 may be in an open position. When a force F is applied to compress the arms 160 of the release lever 46, the release lever 46 is free to move between a lowered position and a raised position. The lowered position and the raised position of the release lever 46 correspond with the locked position and the unlocked position of the latch mechanism 42, respectively. When the release lever 46 is in the raised position, the release lever 46 extends upward from the rail cartridge 26 through the opening 146 of the rail cartridge 26. The raised position of the release lever 46 corresponds with the open position of the tab 156. In other words, when the release lever 46 is moved to the raised position, the tab 156 is simultaneously lowered to the open position. When the tab 156 is in the open position, the open end 140 of the receiving well 30 is unobstructed. Likewise, the lowered position of the release lever 46 corresponds with the closed position of the tab 156. In other words, when the release lever 46 is moved in the lowered position, the tab 156 is simultaneously raised into the closed position. When the tab 156 is in the closed position, the open end 140 of the receiving well 30 is blocked by the tab 156.

The track assembly 10 may further include one or more connection cartridges 34. Each connection cartridge 34 may be paired with and coupled to a respective rail cartridge 26, as discussed above. It will be understood that each of the connection cartridges 34 is uniform in size, shape, and engagement, such that each connection cartridge 34 is coupleable with any one of the rail cartridges 26.

Each connection cartridge 34 may be a U-shaped member and may include first and second sidewalls 170, 172 spaced apart by a top wall 174. The connection cartridge 34 defines an elongated slot 178 extending from a first end 182 of the connection cartridge 34 to a second end 184 of the connection cartridge 34. The connection cartridge 34 may further define an elongated gap 188. The gap 188 may be defined between the first end 182 and the second end 184 of the connection cartridge 34 and may be sized to complement the opening 146 of the rail cartridge 26. The connection cartridge 34 may also define a second pair of receiving apertures 192 proximate the first end 182 of the connection cartridge 34. The second pair of receiving apertures 192 are sized to complement the first pair of receiving apertures 130.

The connection cartridge 34 may be sized to receive the upper portion 104 of the rail cartridge 26. Specifically, the connection cartridge 34 may be of a size and shape that allows the upper portion 104 of the rail cartridge 26 to be received by the elongated slot 178 of the connection cartridge 34 when the connection cartridge 34 is operably coupled with the respective rail cartridge 26. When the upper portion 104 is received by the elongated slot 178, the first and second upper sidewalls 122, 124 and the top wall 126 of the upper portion 104 may be positioned parallel to and substantially flush with the first and second sidewalls 170, 172 and the top wall 174 of the connection cartridge 34. When the connection cartridge 34 is operably coupled with the upper portion 104 of the respective rail cartridge 26, the opening 146 of the rail cartridge 26 may be aligned with the gap 188 of the connection cartridge 34. The opening 146 may be aligned with the gap 188, such that the release lever 46 of the latch mechanism 42 may be positioned to extend through the gap 188 of the connection cartridge 34 at least when the release lever 46 is in the raised position.

The connection cartridge 34 may include the interface member 38, as introduced previously. The interface member 38 is coupled with each of the first and second sidewalls 170, 172 proximate the second end 184 of the connection cartridge 34. For example, the interface member 38 may be configured as a cross-bolt extending between the first and second sidewalls 170, 172. The interface member 38 may have a generally circular, oblong, square, or rectangular cross-section or may have any other cross-sectional shape. Furthermore, the interface member 38 may be of a size and shape configured to be received by the receiving well 30 of the rail cartridge 26.

As introduced previously, the first electrical connector 50 may be coupled with the first end 134 of the rail cartridge 26. In other words, the first electrical connector 50 may be positioned on the first end 134 of the rail cartridge 26 opposite the receiving well 30. For example, the first electrical connector 50 may be coupled with the top wall 126 of the upper portion 104 of the rail cartridge 26. In another example, the first electrical connector 50 may be operably coupled with the first end 134 of the rail cartridge 26 such that the first electrical connector 50 extends upward at least partially past the top wall 126 of the upper portion 104. In various examples, the first electrical connector 50 may be a male connector. In other examples, the first electrical connector 50 may be a female connector.

The second electrical connector 54 may be coupled with the first end 182 of the connection cartridge 34. The second electrical connector 54 is configured to engage with the first electrical connector 50. In other words, the second electrical connector 54 is selected to pair with the first electrical connector 50 (e.g., where the first electrical connector 50 is a male connector, the second electrical connector 54 is a female connector). The second electrical connector 54 may be positioned on the first end 182 of the connection cartridge 34 such that, when the connection cartridge 34 is operably coupled with the rail cartridge 26, the first electrical connector 50 is coupled or engaged with the second electrical connector 54.

Figure 7:
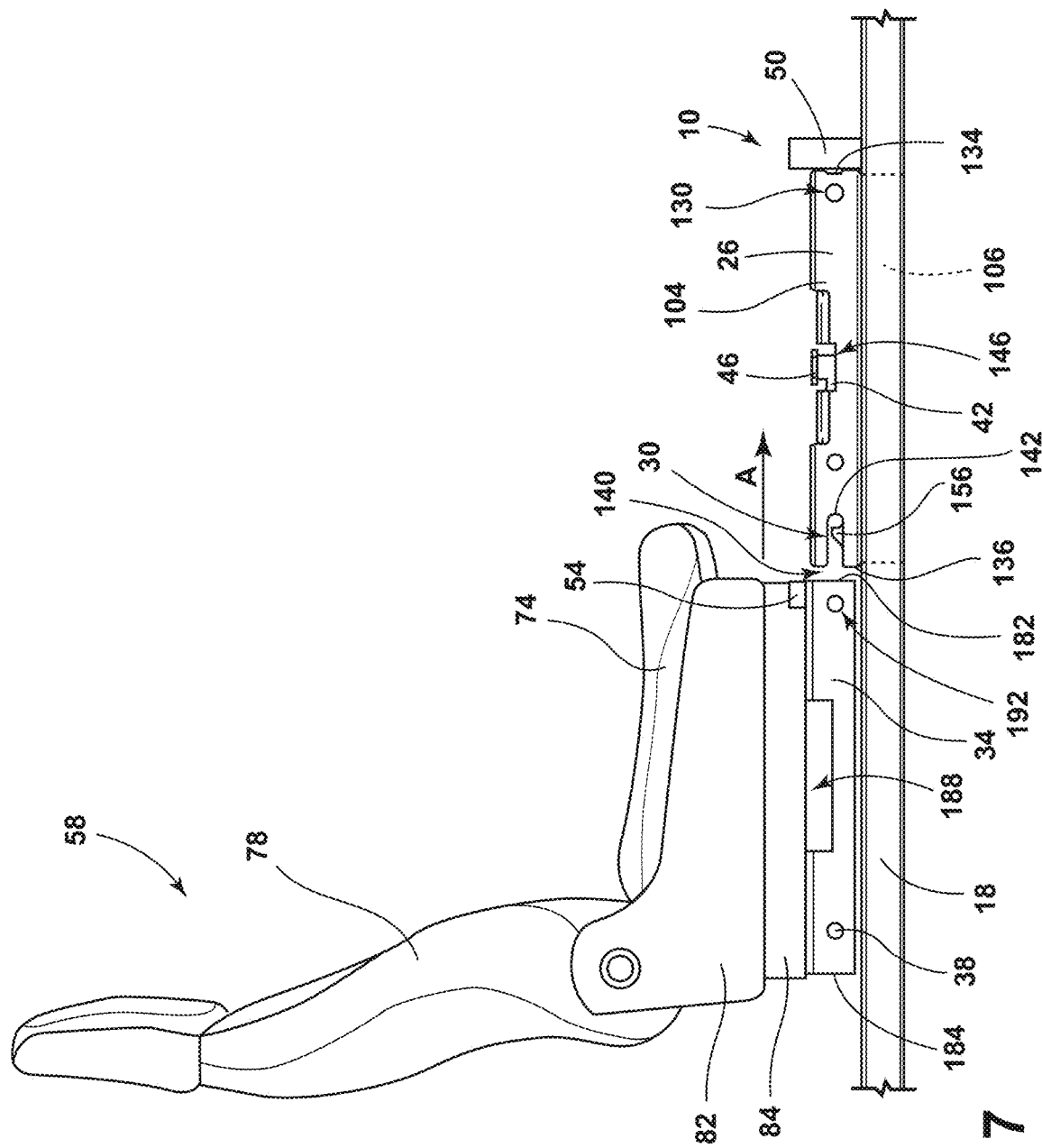
FIG. 7 is a side profile view of a seating assembly prior to engagement with a track assembly, according to some examples.
Figure 8:
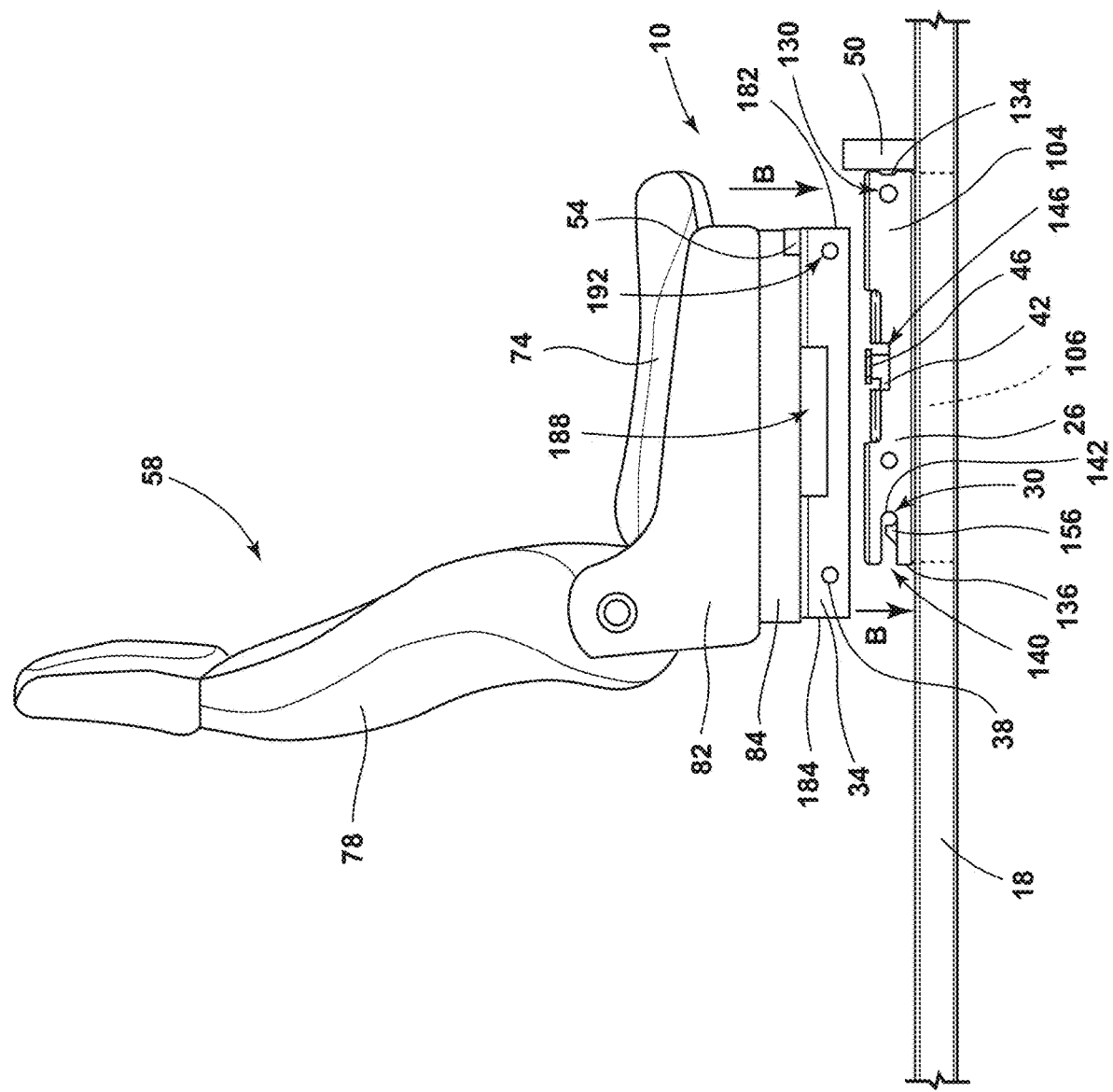
FIG. 8 is a side profile view of a seating assembly prior to engagement with a track assembly, according to some examples.

Referring again to FIGS. 7 and 8, one or more connection cartridges 34 may be coupled with the seating assembly 58 as discussed previously. Upon installation, each connection cartridge 34 may be aligned with the upper portions 104 of the respective rail cartridge 26. Each rail cartridge 26 may be operably coupled with a respective track 18. When the rail cartridge 26 is operably coupled with the track 18, the first electrical connector 50 may be electrical connected with the vehicle 14 (FIG. 3). In various examples, each connection cartridge 34 may be horizontally aligned with the respective rail cartridge 26, as shown in FIG. 7. When each connection cartridge 34 is horizontally aligned with the respective rail cartridge 26, the interface member 38 may be positioned to be received by the receiving well 30. The seating assembly 58 may then slide forward as illustrated by arrow A, such that each connection cartridge 34 slides into engagement with the respective rail cartridge 26. In other words, seating assembly 58 may slide forward so that the first and second sidewalls 170, 172 of each connection cartridge 34 are positioned to frame the upper portion 104 of the respective rail cartridge 26. Stated differently, each connection cartridge 34 is positioned to frame the upper portion 104 of the respective rail cartridge 26. In other examples, each connection cartridge 34 may be vertically offset from the respective rail cartridge 26. The seating assembly 58 may be lowered as illustrated by arrow B until each connection cartridge 34 is horizontally aligned with, and at least partially engaged with, the respective rail cartridge 26, as illustrated in FIG. 8. The seating assembly 58 may then slide forward as illustrated in FIG. 7 until each connection cartridge 34 is fully engaged with the respective rail cartridge 26.

During engagement of each connection cartridge 34 with the respective rail cartridge 26, the slot 178 of the connection cartridge 34 receives the upper portion 104 of the rail cartridge 26 as the connection cartridge 34 slides over the rail cartridge 26. The connection cartridge 34 slides along the rail cartridge 26 until the release lever 46 of the latch mechanism 42 is received by the gap 188 of the connection cartridge 34. The release lever 46 may then be moved into the raised position to lower the tab 156 into the open position and place the latch mechanism 42 in the unlocked position. The interface member 38 slides through the open end 140 of the receiving well 30 and along the receiving well 30 until the interface member 38 abuts the curved edge 142 of the receiving well 30. In other words, when the upper portion 104 of the rail cartridge 26 is received by the slot 178 of the connection cartridge 34, the interface member 38 may be received by the receiving well 30. When the interface member 38 abuts the curved edge 142 of the receiving well 30, the first and second electrical connectors 50, 54 are coupled or engaged. Thus, when the connection cartridge 34 is operably coupled with the respective rail cartridge 26, the interface member 38 may be received by the receiving well 30. The release lever 46 may then be moved into the lowered position such that the tab 156 is in the closed position and the latch mechanism 42 is in the locked position. The tab 156 couples the interface member 38 within the receiving well 30. The connection cartridge 34 is then fully engaged with the rail cartridge 26. It will be understood that coupling the storage container 62 may be performed in a similar manner without departing from the scope of the present disclosure.

Referring again to FIG. 3, a locking pin 196 may be received by the first and second pairs receiving apertures 130, 192 defined by the first and second sidewalls 170, 172 of the connection cartridge 34 and the first and second upper sidewalls 122, 124 of the rail cartridge 26 when the connection cartridge 34 is engaged with the respective rail cartridge 26. The locking pin 196 may be configured as a bolt, screw, or other fastener. The locking pin 196 may act a secondary lock to ensure that the connection cartridge 34 is not inadvertently released from the rail cartridge 26.

Referring again to FIGS. 1, 7, and 8, to remove the seating assembly 58 from the vehicle 14 or connect the seating assembly 58 with the vehicle 14 in a different position, the locking pin 196 may be removed. The force F may be applied to the arms 160 of the release lever 46 of the latch mechanism 42. The release lever 46 may then be moved from the lowered position to the raised position, moving the tab 156 from the closed position to the open position. The connection cartridge 34 may then be slid in an opposite direction of arrow A to remove the interface member 38 from the receiving well 30 and disengage the first and second electrical connectors 50, 54. In other words, the release lever 46 may be configured to selectively release the interface member 38 of the connection cartridge 34 from the receiving well 30 of the respective rail cartridge 26. The seating assembly 58 may then be removed from the vehicle 14 or into a different position within the cabin 70 of the vehicle 14 (FIG. 1).

This configuration allows for easy interchanging and moving of the seating assemblies 58 for various vehicle uses. For example, the seating assemblies 58 may be readily moved forward and rearward within the vehicle 14 and/or may be removed from the vehicle 14. Storage containers 62 may further be readily removed and added between or proximate the seating assemblies 58, allowing for flexibility in the interior configuration of the vehicle 14. Likewise, the uniform use of the connection cartridges 34 and rail cartridges 26 allows for the seating assemblies 58 and the storage containers 62 to be readily interchangeable without having to adjust the hardware of the vehicle 14.

It will be understood by one having ordinary skill in the art that construction of the described disclosure and other components is not limited to any specific material. Other exemplary examples of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A track assembly for a vehicle seating assembly, comprising:
   a track operably coupled with a floor pan;
   a rail cartridge slidably coupled with the track, wherein the rail cartridge includes an upper portion and a lower portion, the upper portion defining a receiving well;
   a connection cartridge operably coupled with a seat base, the connection cartridge including an interface member and defining a slot, wherein the upper portion of the rail cartridge is received within the slot, and further wherein the interface member is received within the receiving well of the rail cartridge; and
   a latch mechanism including a release lever and a tab, wherein the release lever is configured to selectively lower the tab to open the receiving well of the rail cartridge.

2. The track assembly of claim 1, further comprising:
   a first electrical connector coupled with an end of the rail cartridge; and
   a second electrical connector coupled with the connection cartridge, wherein the first electrical connector is configured to engage with the second electrical connector.

3. The track assembly of claim 1, wherein the connection cartridge includes first and second sidewalls spaced apart by a top wall, and further wherein the connection cartridge defines an opening.

4. The track assembly of claim 3, wherein the latch mechanism extends upward from the rail cartridge, and further wherein the latch mechanism is positioned to extend through the opening of the connection cartridge.

5. The track assembly of claim 1, further comprising:
   a locking pin extending through a first pair of receiving apertures defined by the connection cartridge, wherein the locking pin further extends through a second pair of receiving apertures defined by the upper portion of the rail cartridge.

6. The track assembly of claim 1, wherein the latch mechanism is rotatable so that the release lever is movable between a raised position and a lowered position, and further wherein the raised position of the release lever corresponds with an unlocked position of the latch mechanism and the lowered position of the release lever corresponds with a locked position of the latch mechanism.

7. The track assembly of claim 1, wherein the release lever includes first and second opposing arms.

8. A track assembly comprising:
   a track;
   a rail cartridge slidably coupled with the track and defining a receiving well;
   a connection cartridge coupled with the rail cartridge and including an interface member, wherein the interface member is configured to be received within the receiving well of the rail cartridge;
   a latch mechanism including a release lever, the release lever configured to selectively release the interface member of the connection cartridge from the receiving well of the rail cartridge;
   a first electrical connector coupled with the rail cartridge; and
   a second electrical connector coupled with the connection cartridge, wherein the first electrical connector is coupled with the second electrical connector when the interface member of the connection cartridge is positioned within the receiving well of the rail cartridge.

9. The track assembly of claim 8, wherein the rail cartridge includes an upper portion integrally formed with a lower portion, and further wherein the upper portion extends upward from the lower portion.

10. The track assembly of claim 9, wherein the connection cartridge includes first and second sidewalls spaced apart by a top wall, and further wherein the first and second sidewalls are positioned to frame the upper portion of the rail cartridge.

11. The track assembly of claim 9, wherein the upper portion is narrower than the lower portion.

12. The track assembly of claim 8, wherein the connection cartridge is coupled with a seat base.

13. The track assembly of claim 8, wherein the connection cartridge is coupled with a storage container.

14. The track assembly of claim 8, wherein the receiving well extends from an end of the rail cartridge opposite the first electrical connector.

15. A track assembly comprising:
   a rail cartridge including an upper portion and a lower portion, the upper portion defining a receiving well;
   a connection cartridge including an interface member and defining a slot, wherein the interface member is configured to be received within the receiving well of the rail cartridge when the upper portion of the rail cartridge is received by the slot;
   a first electrical connector positioned on an end of the rail cartridge; and
   a second electrical connector positioned on the connection cartridge, wherein the first electrical connector is coupled with the second electrical connector when the interface member of the connection cartridge is positioned within the receiving well of the rail cartridge.

16. The track assembly of claim 15, wherein the lower portion of the rail cartridge is slidably received by a track.

17. The track assembly of claim 16, wherein the connection cartridge is positioned to frame the upper portion of the rail cartridge.

18. The track assembly of claim 15, further comprising:
   a latch mechanism hingedly coupled with the rail cartridge, wherein the latch mechanism includes a release lever.

19. The track assembly of claim 18, wherein the latch mechanism further includes a tab, wherein the release lever is configured to be selectively lowered to move the tab from an open position to a closed position.

20. The track assembly of claim 19, wherein the interface member is coupled within the receiving well when the tab is in the closed position.

* * * * *